United States Patent
Ranganathan et al.

(10) Patent No.: US 11,091,573 B2
(45) Date of Patent: Aug. 17, 2021

(54) HYDROSILYLATION CROSSLINKING OF POLYOLEFIN CABLE COMPONENTS

(71) Applicant: GENERAL CABLE TECHNOLOGIES CORPORATION, Highland Heights, KY (US)

(72) Inventors: Sathish Kumar Ranganathan, Indianapolis, IN (US); Vijay Mhetar, Carmel, IN (US); Sean William Culligan, Zionsville, IN (US); Srinivas Siripurapu, Carmel, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 205 days.

(21) Appl. No.: 15/360,521

(22) Filed: Nov. 23, 2016

(65) Prior Publication Data

US 2017/0145131 A1    May 25, 2017

Related U.S. Application Data

(60) Provisional application No. 62/260,159, filed on Nov. 25, 2015.

(51) Int. Cl.
| | | |
|---|---|---|
| *C08F 210/18* | (2006.01) | |
| *C08K 5/54* | (2006.01) | |
| *H01B 3/28* | (2006.01) | |
| *C08K 5/5425* | (2006.01) | |
| *C08L 23/08* | (2006.01) | |
| *H01B 3/44* | (2006.01) | |
| *C08F 210/02* | (2006.01) | |
| *C08J 3/24* | (2006.01) | |
| *C08K 3/34* | (2006.01) | |
| *C08K 3/36* | (2006.01) | |

(52) U.S. Cl.
CPC .......... *C08F 210/18* (2013.01); *C08F 210/02* (2013.01); *C08J 3/24* (2013.01); *C08K 3/34* (2013.01); *C08K 3/346* (2013.01); *C08K 5/54* (2013.01); *C08K 5/5425* (2013.01); *C08L 23/083* (2013.01); *H01B 3/28* (2013.01); *H01B 3/441* (2013.01); *C08F 2500/08* (2013.01); *C08F 2810/20* (2013.01); *C08J 2323/04* (2013.01); *C08J 2323/06* (2013.01); *C08J 2323/10* (2013.01); *C08J 2323/16* (2013.01); *C08J 2323/26* (2013.01); *C08K 3/36* (2013.01)

(58) Field of Classification Search
CPC .................... C08F 210/18; C08J 3/24
See application file for complete search history.

(56) References Cited

U.S. PATENT DOCUMENTS

| | | | |
|---|---|---|---|
| 4,336,355 A | 6/1982 | Wu | |
| 4,455,406 A | 6/1984 | Bergault et al. | |
| 4,574,133 A | 3/1986 | Umpleby | |
| 4,831,081 A | 5/1989 | King, III et al. | |
| 4,954,401 A | 9/1990 | Revis | |
| 5,532,315 A | 7/1996 | Bonekamp et al. | |
| 5,672,660 A | 9/1997 | Medsker et al. | |
| 6,013,729 A * | 1/2000 | Tsujimoto | C08K 5/5419 525/105 |
| 6,043,309 A | 3/2000 | Nakamura et al. | |
| 6,337,367 B1 | 1/2002 | Cope | |
| 6,455,637 B1 | 9/2002 | Jackson et al. | |
| 6,552,112 B1 * | 4/2003 | Redondo | C08K 3/22 174/110 SR |
| 7,247,385 B1 | 7/2007 | Tzoganakis et al. | |
| 8,011,913 B2 | 9/2011 | Abraham et al. | |
| 8,415,443 B2 | 4/2013 | Delis et al. | |
| 8,653,170 B2 | 2/2014 | Nadella et al. | |
| 8,678,100 B2 | 3/2014 | Guest et al. | |
| 8,835,540 B2 | 9/2014 | Matsukura et al. | |
| 2003/0127239 A1 | 7/2003 | Fomperie | |
| 2003/0232202 A1 | 12/2003 | Yaginuma et al. | |
| 2005/0148727 A1 * | 7/2005 | Ajbani | C08L 53/005 525/63 |
| 2005/0171288 A1 | 8/2005 | Fujimoto et al. | |
| 2007/0142550 A1 | 6/2007 | Scurati et al. | |
| 2014/0357755 A1 | 12/2014 | Zhu | |

FOREIGN PATENT DOCUMENTS

| | | | |
|---|---|---|---|
| EP | 0856517 A1 | | 8/1998 |
| JP | 2001-348464 A | | 12/2001 |
| JP | 2001348464 | * | 12/2001 |
| WO | 2007023180 A1 | | 3/2007 |

OTHER PUBLICATIONS

Young, Lee W.; International Search Report and Written Opinion of the International Searching Authority, issued in International Application No. PCT/US2016/063588; dated Feb. 3, 2017; 9 pages.
Wikipedia; EPDM rubber; Jul. 8, 2015; URL: https://en.wikipedia.org/w/index.php?title=EPDM_rubber&oldid=670493779; 3 pages.
Marsitzky, Dirk; Extended European search report, including the supplementary European search report and the European search opinion, issued in European Patent Application No. 16869265.5; dated Jul. 10, 2019; 6 pages.

* cited by examiner

*Primary Examiner* — Monique R Peets
(74) *Attorney, Agent, or Firm* — Ulmer & Berne LLP

(57) ABSTRACT

A method of crosslinking a polyolefin resin with a silyl hydride crosslinking agent is disclosed. Crosslinkable compositions containing a polyolefin resin having about 0.9% to about 10% diene groups and a silyl hydride crosslinking agent are also disclosed.

14 Claims, 1 Drawing Sheet

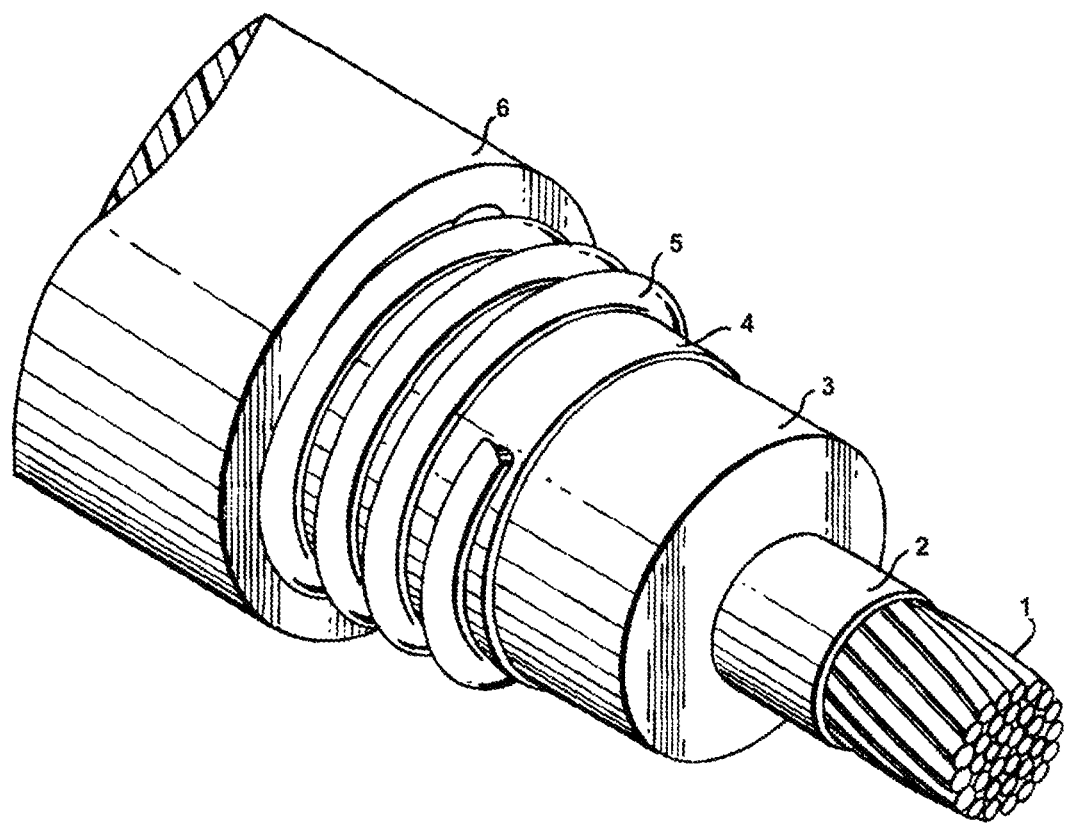

HYDROSILYLATION CROSSLINKING OF POLYOLEFIN CABLE COMPONENTS

REFERENCE TO RELATED APPLICATIONS

The present application claims the priority benefit of U.S. provisional patent application Ser. No. 62/260,159, entitled HYDROSILYLATION CROSSLINKING OF POLYOLEFIN CABLE COMPONENTS, filed Nov. 25, 2015, and hereby incorporates the same application herein by reference in its entirety.

TECHNICAL FIELD

The present disclosure generally relates to the hydrosilylation of polyolefins, and more particularly to the curing of polyolefin cable insulation and cable jacket layers using a hydrosilylation process.

BACKGROUND

It is known to crosslink, or cure, polymers to improve thermal characteristics such as deformation performance at elevated temperatures. Crosslinking of polyolefin resins is commonly utilized, for example, in the formation of cable insulation and jacket layers of low, medium, and high voltage wires and cables.

The most common method of crosslinking polyolefin resins for medium and high voltage wire and cable insulation is peroxide crosslinking. However, peroxide crosslinking suffers from several drawbacks such as the requirement of a large capital investment for the purchase and operation of a continuous vulcanization ("CV") tube and the generation of byproducts during the crosslinking process that must be removed in a secondary degassing operation. Degassing steps add to the costs of the crosslinking process and increase the required working capital.

Another common crosslinking method is moisture curing using silane grafted copolymers. Although moisture curing processes do not require the use of a CV tube, moisture curing processes typically still require secondary processes to provide moisture across the cross section of the insulation until crosslinking is complete. In addition, moisture curing generates substantial byproducts such as alcohols generated from condensation of alcoxy groups from silanes grafted on the polymers. As a consequence, moisture curing processes are not widely used for curing medium and high voltage cable insulation layers.

In view of the drawbacks of the conventional crosslinking processes, it would be desirable to provide an improved method to crosslink polyolefin resin compositions that can achieve the desirable mechanical and electrical properties of crosslinking without requiring the specialized equipment or steps necessary for moisture curing and peroxide curing processes.

SUMMARY

In accordance with one embodiment, a crosslinkable composition includes a polyolefin resin, a silyl hydride crosslinking agent, and a catalyst. The polyolefin resin includes about 0.9% to about 10%, by weight, diene groups. The diene groups are capable of crosslinking with the silyl hydride crosslinking agent.

In accordance with another embodiment, a method of crosslinking a polyolefin resin includes combining a polyolefin resin, a silyl hydride crosslinking agent, and a catalyst to form a crosslinkable polyolefin composition, extruding the crosslinkable polyolefin composition, and crosslinking the crosslinkable polyolefin composition. The unsaturated polyolefin resin includes about 0.9% to about 10%, by weight, diene groups.

BRIEF DESCRIPTION OF THE DRAWINGS

FIG. 1 depicts a perspective view of a power cable including an insulation layer or jacket layer formed of a crosslinked polyolefin composition according to one embodiment.

DETAILED DESCRIPTION

An improved method to crosslink polyolefin resins can include the use of a hydrosilylation reaction to crosslink a polyolefin resin with a silyl hydride crosslinking agent in the presence of a suitable catalyst. The improved crosslinking method can be useful to form cable insulation and cable jacket layers.

As can be appreciated, the improved crosslinking method can allow for the formation of a crosslinked polyolefin that can exhibit desirable mechanical and electrical properties. For example, selection of suitable polyolefin resins and crosslinking agents can allow for the formation of a crosslinked polyolefin that exhibits an elongation at break of about 100% or more, and a tensile strength of about 500 MPa or more. In certain embodiments, the elongation at break can be about 250% or more for medium voltage systems and about 150% or more for low voltage systems. In certain embodiments, the crosslinked polyolefin can have a tensile strength of about 1,000 PSI or more. Such crosslinked polyolefins can also exhibit, after water aging for 7 days in 90° C. water, a tan delta of about 1.5% or less, a SIC of about 3 or less, and an insulation resistance of about $1*10^{13}$ ohm or more, each when measured at room temperature. In certain embodiments, insulation resistance can be about $1*10^9$ ohms or more. Similar beneficial electrical properties can also be observed when measured at 90° C.

According to certain embodiments, suitable polyolefin resins can generally include any polyolefin that includes one or more carbon-carbon double bonds such as polyolefin resins having a diene or vinyl functional group. In certain embodiments, the unsaturated vinyl group can be located in one or more pendant or terminal positions of the polyolefin resin to promote crosslinking. In certain embodiments, an unsaturated group can also be grafted to the polyolefin. As can be appreciated, the selection of a polyolefin resin can influence the electrical and mechanical properties of the resulting crosslinked polyolefin as well as the reaction dynamics of the crosslinking method. In certain embodiments, aliphatic polyolefins such as polyethylene (including, for example, low-density polyethylene ("LDPE"), medium density polyethylene ("MDPE"), high-density polyethylene ("HDPE"), and linear low-density polyethylene ("LLDPE")), ethylene vinyl acetate copolymer ("EVA"), ethylene propylene diene terpolymer ("EPDM"), ethylene propylene rubber ("EPR"), polypropylene ("PP"), polybutadiene, and copolymers, alloys, and blends thereof can be suitable. In certain embodiments, the polyolefin resin can be selected from EPDM and polyethylene.

As can be appreciated, the selection of a suitable polyolefin resin can influence both the selection of other components included in a crosslinkable polyolefin composition as well as the properties exhibited by the crosslinked composition. For example, if the predominant polyolefin resin is a polyethylene resin such as LDPE or LLDPE, the unsaturated groups can be grafted and can be vinyl functional groups to improve the properties of the system. In embodiments including ethylene propylene diene terpolymer as the predominant polyolefin resin, the unsaturated groups can be pendant and can be vinyl functional groups. Polyolefin systems including LDPE or LLDPE as the predominant polyolefin resin can be useful to form the insulation layer of medium voltage and high voltage cables. Polyolefin systems including EPDM as the predominant polyolefin resin can be useful to form the insulation layer of low voltage and medium voltage systems.

As used herein, low voltage means voltages of about 1 kV or less. As used herein, medium voltage means voltages between about 1 kV and about 69 kV. As used herein, high voltage means voltages of about 69 kV or more.

As can be further appreciated, it can also be advantageous in certain embodiments to include a blend of more than one polyolefin resin. For example, in certain embodiments, about 50% by weight or more, of the polyolefin resin can be LDPE or LLDPE. In certain embodiments, about 70% or more of the polyolefin resin can be LDPE or LLDPE. In such embodiments, about 5% to about 40%, by weight, of the polyolefin resin can be EPDM and in certain embodiments, about 20%, by weight.

Alternatively, in certain embodiments, about 50% by weight or more, of the polyolefin resin can be EPDM. In certain embodiments, about 70% or more of the polyolefin resin can be EPDM. In such embodiments, about 5% to about 40%, of the polyolefin resin can be one or more of LDPE, LLDPE, and EVA, and in certain embodiments, about 20%.

The diene groups of suitable EPDM terpolymers can, in certain embodiments, be bicylic copolymers such as vinyl-norbornene ("VNB") having a diene content of about 0.9%, by weight, and ethylidene norbornene ("ENB") having a diene content of about 9.4%, by weight, each of which are useful, non-limiting, examples of suitable EPDM diene groups. In certain embodiments, suitable EPDM terpolymers can alternatively include non-bicyclic diene groups. As can be appreciated, other unsaturated polyolefins can also be suitable including commercially obtained polyolefin resins such as certain grades of Vistalon™ EPDM from Exxon Mobile Chemical Co., Vistamax™ EPR from Exxon Mobile Chemical Co., super cure LDPE, Dowlexx™ HDPE from the Dow Chemical Co., Nordel™ EPDM from the Dow Chemical Co., Royaledge® EPDM from Lion Elastomers LLC, Adflex PP Catalloy from Lyondellbasell Industries N.V., Keltan® EPDM from Lanxess Buna GmbH, Elvax® EVA from DuPont, Escorene™ EVA from Exxon Mobile Chemical Co., Ateva® EVA from the Celanese Corp., Evatane® EVA from Arkema Group, and Petrothene® polyethylene from Lyondellbasell Industries N.V. For example, Borlink LS 4201 (obtained from *Borealis* AG) has a diene content of about 2%, by weight, and can exhibit suitable mechanical and electrical properties after crosslinking.

Suitable unsaturated polyolefin resins can have a diene content, by weight, of about 0.5% to about 15% in certain embodiments, a diene content of about 0.9% to about 10%, by weight, in certain embodiments, a diene content of about 1% to about 9%, by weight, in certain embodiments, a diene content of about 1% to about 7%, by weight, in certain embodiments, a diene content of about 1% to about 5%, by weight, in certain embodiments, a diene content of about 1% to about 4%, by weight, in certain embodiments, and a diene content of about 1.5% to about 3%, by weight, in certain embodiments. In certain embodiments, suitable unsaturated polyolefin resins can also have a diene content, by weight, of about 0.9% or more, about 1% or more, about 1.5% or more, about 2.5% or more, about 10% or less, about 9% or less, about 7.7% or less, and about 7% or less. As can be appreciated, a blend of multiple polyolefins can also be used to reach a desired diene content. Suitable diene groups can be pendant, branched, grafted, or terminal and in certain embodiments, can be a vinyl functional group. In certain embodiments, suitable polyolefin resins can also include one or more additional functional groups including one or more silanol, maleic anhydride, epoxy, hydroxyl, and acid functional groups.

The polyolefin resin can be crosslinked and cured using a suitable hydrosilylation crosslinking agent. In certain embodiments, such hydrosilylation crosslinking agents can generally be selected from silyl hydride monomers, oligomers, dendrimers, cyclomers, polymers, or groups thereof. For example, suitable crosslinking agents can be silane or siloxane compounds. Additional examples of suitable silyl hydride compounds can include, without limitation, hydride terminated polymethyl siloxane, hydride terminated polymethyl siloxane, tris(dimethylsiloxy) phenyl silane, 1,10 di siladecane, tetrakis(dimethylsiloxy)silane, trialkoxy terminated silyl hydride (trimethoxy), and tris(dimethylsiloxy) ethoxysilane. In certain embodiments, suitable silyl hydride crosslinking agents can have a viscosity less than about 20 centistokes, and in certain embodiments, a viscosity less than about 5 centistokes. In certain embodiments, the silicon in each silyl hydride can be bonded to two methyl groups to improve the reactivity of the silyl hydride.

A suitable crosslinking agent can generally be blended, or dispersed, with the polyolefin resin to form a crosslinkable polyolefin composition. A crosslinking agent can be included at about 1 part to about 20 parts, by weight of the polyolefin resin in certain embodiments, at about 3 parts to about 10 parts by weight of the polyolefin resin in certain embodiments, and at about 4 parts to about 7 parts by weight of the polyolefin resin in certain embodiments. As can be appreciated, the crosslinking agent can undergo hydrosilylation addition reactions with the polyolefin resins to cause crosslinking of the polyolefin resin composition.

The hydrosilylation reaction can be a catalyzed by a suitable catalyst. According to certain embodiments, any hydrosilylation catalyst can be used to catalyze the hydrosilylation reaction including, without limitation, Column VIII metals, cobalt, iron, nickel and metal complexes thereof. More specific examples of such catalysts can include palladium, platinum, rhodium, and complexes thereof. For example, in certain non-limiting embodiments, the catalyst can be selected from platinum carbonyl cyclovinylmethylsiloxane, platinum divinyltetramethyldisiloxane, platinum methylvinylcyclosiloxane, platinum cyclovinylmethylsiloxane, and platinum octanaldehyde/octanol. As can be appreciated, the catalyst can be provided in any suitable form including, for example, as part of a liquid composition or masterbatch and can be provided as a pure metal, as a metal complex, as a resin-metal complex, as a core shell type catalyst, as a porous catalyst, and as a catalyst coated ceramic particle. Upon mixing of the liquid catalyst solution into a polyolefin resin composition, the metal content in the catalyst can be present in certain embodiments at a concentration of about 1 part-per-million ("ppm") to about 1,000 ppm, and in certain embodiments at a concentration of about 5 ppm to about 500 ppm.

As can be appreciated, the improved crosslinking method disclosed herein can be used to form one or more insulation and jacket layers of a cable. In such embodiments, the catalyst can be blended with a polyolefin resin composition to allow for extrusion and subsequent curing of the composition. In certain such embodiments, the suitable catalyst can be dispersed in a liquid solution and included in the polyolefin composition at about 0.1 part to about 1 part by weight of the polyolefin resin.

As can be appreciated, one or more additional components can also be blended into the polyolefin composition in certain embodiments. For example, one or more of a stabilizer, processing oil, or filler can be included in certain embodiments.

According to certain embodiments, a suitable stabilizer for the polyolefin resin composition can include at least one of an ultraviolet ("UV") stabilizer, a light stabilizer, a heat stabilizer, a lead stabilizer, a metal deactivator; or any other suitable stabilizer. In certain embodiments, a stabilizer can be present in the polyolefin resin composition from about 0.1 part to about 5 parts, by weight; in certain embodiments from about 0.5 part to about 2 parts; and in certain embodiments from about 0.75 part to about 1.5 parts.

According to certain embodiments, suitable antioxidants for inclusion in the polyolefin composition can include, for example, amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl)propionate], 4,4'-thiobis(2-tert-butyl-5-methylphenol), 2,2'-thiobis(4-methyl-6-tert-butyl-phenol), benzenepropanoic acid, 3,5-bis(1,1-dimethylethyl)4-hydroxy benzenepropanoic acid, 3,5-bis(1,1-dimethylethyl)-4-hydroxy-C13-15 branched and linear alkyl esters, 3,5-di-tert-butyl-4-hydroxyhydrocinnamic acid C7-9-branched alkyl ester, 2,4-dimethyl-6-t-butylphenol tetrakis{methylene-3-(3',5'-ditert-butyl-4'-hydroxyphenol)propionate}methane or tetrakis {methylene3-(3',5'-ditert-butyl-4'-hydrocinnamate}methane, 1,1,3tris(2-methyl-4-hydroxyl-5-butylphenyl) butane, 2,5,di t-amyl hydroqunone, 1,3,5-tri methyl2,4,6tris (3,5di tert butyl-4-hydroxybenzyl)benzene, 1,3,5tris(3,5di-tert-butyl-4-hydroxybenzyl)isocyanurate, 2,2-methylene-bis-(4-methyl-6-tert butyl-phenol), 6,6'-di-tert-butyl-2,2'-thiodi-p-cresol or 2,2'-thiobis(4-methyl-6-tert-butylphenol), 2,2-ethylenebis(4,6-di-t-butylphenol), triethyleneglycol bis{3-(3-t-butyl-4-hydroxy-5-methylphenyl)propionate}, 1,3,5-tris(4tert-butyl-3-hydroxy-2,6-dimethylbenzyl)-1,3,5-triazine-2,4,6-(1H,3H,5H)trione, 2,2-methylenebis {6-(1-methylcyclohexyl)-p-cresol}; sterically hindered phenolic antioxidants such as pentaerythritol tetrakis(3-(3,5-di-tert-butyl-4-hydroxyphenyl)propionate); hydrolytically stable phosphite antioxidants such as tris(2,4-ditert-butylphenyl) phosphite; and/or sulfur antioxidants, such as bis(2-methyl-4-(3-n-alkylthiopropionyloxy)-5-t-butylphenyl)sulfide, 2-mercaptobenzimidazole and its zinc salts, pentaerythritol-tetrakis(3-lauryl-thiopropionate), and combinations thereof. Antioxidants can be included in the polyolefin composition in amounts ranging from about 2 parts by weight polyolefin resin in certain embodiments, from about 1 part by weight polyolefin resin in certain embodiments, and from about 0.5 parts by weight polyolefin resin in certain embodiments. In certain embodiments, it can be advantageous to use a blend of multiple antioxidants such as a blend of a sterically hindered phenolic antioxidant and a hydrolytically stable phosphite antioxidant.

Suitable UV stabilizers can be selected from compounds such as: benzophenones, triazines, banzoxazinones, benzotriazoles, benzoates, formamidines, cinnamates/propenoates, aromatic propanediones, benzimidazoles, cycloaliphatic ketones, formanilides, cyanoacrylates, benzopyranones, salicylates, and combinations thereof. Specific examples of UV stabilizers can include 2,2"-methylenebis (6-(2H-benzotriazol-2-yl)-4-4(1,1,3,3,-tetramethylbutyl) phenol, available as LA-31 RG from Adeka Palmarole (Saint Louis, France) having CAS #103597-45-1; and 2,2'-(p-phenylene) bis-4-H-3,1-benzoxazin-4-one, available as Cyasorb UV-3638 from Cytec Industries (Stamford, Conn.) and having CAS #18600-59-4.

Hindered amine light stabilizers ("HALS") can be used as a light stabilizer according to certain embodiments. HAL S can include, for example, bis(2,2,6,6-tetramethyl-4-piperidyl)sebaceate; bis(1,2,2,6,6-tetramethyl-4-piperidyl)sebaceate with methyl 1,2,2,6,6-tetrameth-yl-4-piperidyl sebaceate; 1,6-hexanediamine, N,N'-bis(2,2,6,6-tetramethyl-4-piperidyl)polymer with 2,4,6 trichloro-1,3,5-triazine; reaction products with N-butyl2,2,6,6-tetramethyl-4-piperidinamine; decanedioic acid; bis(2,2,6,6-tetramethyl-1-(octyloxy)-4-piperidyl)ester; reaction products with 1,1-dimethylethylhydroperoxide and octane; triazine derivatives; butanedioc acid; dimethylester, polymer with 4-hydroxy-2,2,6,6-tetramethyl-1-piperidine ethanol; 1,3,5-triazine-2,4,6-triamine,N,N"'-[1,2-ethane-diyl-bis[[[4,6-bis-[butyl(1,2,2,6,6pentamethyl-4-piperdinyl)amino]-1,3,5-triazine-2-yl]imino-]-3,1-propanediyl]]bis[N',N"-dibutyl-N', N"bis(2,2,6,6-tetramethyl-4-pipe-ridyl); bis (1,2,2,6,6-pentamethyl-4-piperidinyl) sebacate; poly[[6-[(1,1,3,3-terramethylbutyl)amino]-1,3,5-tri azine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. In certain embodiments, a suitable HALS can be bis(1,2,2,6,6-pentamethyl-4-piperidinyl) sebacate.

Suitable heat stabilizer can include, but are not limited to one or more of: 4,6-bis (octylthiomethyl)-o-cresol dioctadecyl 3,3'-thiodipropionate; poly[[6-[(1,1,3,3-terramethyl-butyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]; benzenepropanoic acid; 3,5-bis(1,1-dimethyl-ethyl)-4-hydroxy-C7-C9 branched alkyl esters; and isotridecyl-3-(3,5-di-tert-butyl-4-hydroxyphenyl) propionate. According to certain embodiments, the heat stabilizer can be 4,6-bis (octylthiomethyl)-o-cresol; dioctadecyl 3,3'-thiodipropionate and/or poly[[6-[(1,1,3,3-terramethylbutyl) amino]-1,3,5-tri azine-2,4-diyl][2,2,6,6-tetramethyl-4-piperidinyl)imino]-1,6-hexanediyl[(2,2,6,6-tetramethyl-4-piperidinyl)imino]].

A suitable lead stabilizer can include a lead oxide, such as for example, red lead oxide $Pb_3O_4$. However, as will be appreciated, any other suitable lead stabilizer can also be used alone or in combination with red lead oxide. In certain embodiments, a polyolefin resin composition can alternatively be substantially lead-free. As will be appreciated, lead-free compositions can be advantageous for safety reasons and can allow for wider usage of the crosslinked composition.

A suitable metal deactivator can include, for example, N,N'-bis(3-(3,5-di-t-butyl-4-hydroxyphenyl)propionyl)hydrazine, 3-(N-salicyloyl)amino-1,2,4-triazole, and/or 2,2'-oxamidobis-(ethyl 3-(3,5-di-t-butyl-4-hydroxyphenyl)propionate).

Processing oils can be used to improve the processability of a polyolefin composition by forming a microscopic dispersed phase within a polymer carrier. During processing, the applied shear can separate the process aid (e.g., processing oil) phase from the carrier polymer phase. The processing oil can then migrate to the die wall to gradually form a continuous coating layer to reduce the backpressure of an extruder and reduce friction during extrusion. The processing oil can generally be a lubricant, such as, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, or combinations thereof. In certain embodiments, a processing oil can be included from about 1 part or less, by weight of the polyolefin resin. In certain embodiments, a polyolefin resin composition can also be substantially free of any processing oil. As used herein, "substantially free" means that the component is not intentionally added to the composition and, or alternatively, that the component is not detectable with current analytical methods.

In certain embodiments, optional filler can be included to improve the properties of the crosslinked polyolefin resin composition. Examples of suitable fillers can include talc, calcined clay, and combinations thereof. Generally, particles of the filler can vary in size and can have, for example, an average particle size between about 50 nm and about 200 microns according to certain embodiments. Suitable particles can also vary in shape and can be selected from shapes such as spherical, hexagonal, platy, tabular, etc. In certain embodiments, the average particle size of a portion of the filler can also be selected. For example, in certain embodiments, about 80%, or more, of the particles in the filler can have an average particle size of about 20 microns or less. Filler can be included up to about 100 parts by weight in certain embodiments and from about 25 parts to about 75 parts in certain embodiments.

As can be appreciated, the quantity of filler included can vary depending on the selection of the polyolefin resin and the intended use of the crosslinked polyolefin resin compositions. For example, compositions including one or more of LDPE and LLDPE as the predominant polyolefin resin can include less filler than similar compositions including EPDM as the predominant polyolefin resin. Compositions including LDPE or LLDPE as the predominant polyolefin resin can include about 20 parts, or less, filler in certain embodiments, about 10 parts, or less, filler in certain embodiments, and substantially no filler in certain embodiments. As can be appreciated, excess filler can impact elongation and other electrical properties of the crosslinked polyolefin resin. Compositions including EPDM as the predominant polyolefin resin can include substantially more filler. In certain such embodiments, filler can be included at up to about 200 parts by weight, and in certain embodiments, at about 100 parts by weight.

The quantity of filler can also be varied depending on the voltage class of cables coated with the crosslinked polyolefin resin systems. For example, medium voltage systems can include about 10 parts to about 100 parts filler in certain embodiments. Low voltage systems, in contrast, can be formulated to be fire resistant and can include about 10 parts to about 200 parts filler. Fire resistant compositions can additionally include additional fire resistant fillers and carbon black.

Crosslinkable polyolefin resin compositions can be prepared by blending the components/ingredients in conventional masticating equipment including, for example, a rubber mill, brabender mixer, banbury mixer, buss-ko kneader, farrel continuous mixer, or twin screw continuous mixer. The extruder screw diameter can be between about 25 mm and about 250 mm. The components can be premixed before addition to the polyolefin resin base polymer. The catalyst can be added directly to the polyolefin resin composition or can be added as a masterbatch formed of carrier resin or filler. The mixing time can be selected to ensure a homogenous mixture. The crosslinkable polyolefin resin compositions can then be extruded around a cable and allowed to cure without requiring additional steps such as outgassing or heating to elevated temperatures.

According to certain embodiments, crosslinkable compositions described herein including polyolefin resins can be mixed and extruded at elevated temperatures. For example, crosslinkable compositions can be mixed and extruded at temperatures of about 50° C. to about 250° C. in certain embodiments, and at temperatures of about 75° C. to about 150° C. in certain embodiments.

As can be appreciated, the crosslinkable polyolefin resin compositions disclosed herein can be particularly advantageous for the formation of cable insulation or jacket layers. In such embodiments, the crosslinkable polyolefin resin compositions, including the catalyst, can be extruded around a conductor and cured without requiring the equipment or additional steps required for a moisture cure or peroxide cure process. As can be appreciated, other advantages are also possible. For example, the scorch resistance of the polyolefin resin composition can be sufficiently high to produce cables with any die scorching or screw blocking. Additionally, the curing can occur rapidly and can, for example, be cured before being wound on a reel in about 1 hour or less at appropriate temperatures. In certain embodiments, curing can also be accelerated by preheating the cable surface with an IR heat source or any other heat source.

As can be appreciated, the crosslinkable polyolefin resin compositions described herein can generally be used on any type of cable which includes a crosslinked polyolefin layer. For example, the crosslinkable polyolefin resins described herein can be used with low voltage, medium voltage, and high voltage power transmission and distribution cables, network cables, cables for renewable energy (e.g., solar and wind cables), cables inside the containment vessel of a nuclear reactor, industrial cables, subsea cables, and direct current cables. Additionally, the crosslinkable polyolefin resin compositions described herein can be used on cable accessories. For example, transformers, insulators, deadends/termination products, splices/joints, products, suspension and support products, motion control/vibration products "dampers", guying products, wildlife protection and deterrent products, conductor and compression fitting repair parts, substation products, clamps and other transmission and distribution accessories can be coated with a crosslinkable polyolefin resin composition as described herein.

The cables and cable accessories can be used in a wide variety of environments as a consequence of the durability of the crosslinked polyolefin resin compositions. For example, the cables and cable accessories coated with such crosslinked polyolefin resin compositions can be used directly underground, in underground ducts, in air, under fresh water, under salt water, in conduits, and in cable trays.

Table 1 depicts a general comparison of properties between the hydrosilylation cure process disclosed herein and comparative peroxide curing, moisture cure, and non-crosslinked thermoplastic processes. A Hot Creep Test was used to determine whether crosslinking occurred for a desired composition. The Hot Creep Test was performed in accordance with UL 2556 (2013) on a dumbbell shaped, 75 mil thickness sample at 150° C. using the pass or fail criteria delineated in Insulated Cable Engineers Association ("ICEA") S-95-658, 6.6.3. A sample was considered to pass the Hot Creep Test when the sample exhibited an elongation of less than 50% and a hot creep set value of less than 5%.

TABLE 1

| Properties | Unit | Hydrosilylation | Peroxide Cure | Moisture Cure | Thermoplastic |
|---|---|---|---|---|---|
| Cable flexibility | | Excellent | Very good | Excellent | Poor |
| Tensile strength | PSI | 500-750 | 500-750 | 500-750 | 750-1000 |
| Elongation @ break | % | >250 | >250 | >250 | >250 |
| Hot Creep Test | at 150° C. | Pass | Pass | Pass | Fail |
| Electricals - 90° C. Water immersed | | | | | |
| Insulation Resistance @ 90° C. - Initial | Ohms | >$10^{13}$ | >$10^{13}$ | >$10^{13}$ | >$10^{13}$ |
| Insulation Resistance @ 90° C. - after 28 days | Ohms | >$10^{13}$ | >$10^{13}$ | >$10^{13}$ | >$10^{13}$ |
| Tan delta @ 90° C. - Initial | % | 0.1 | 0.2 | 0.2 | 0.1 |
| Tan delta @ 90° C. - after 28 days | % | 0.1 | 0.2 | 0.2 | 0.1 |
| SIC @ 90° C. - Initial | | 2.2 | 2.4 | 2.4 | 2.2 |
| SIC @ 90° C. - after 28 days | | 2.2 | 2.4 | 2.4 | 2.2 |
| Manufacturing Process | | | | | |
| CV Tube | | No | Yes | No | No |
| Degassing/additional cure step | | No | Yes | Yes | No |
| MV/HV/EHV | | Yes | Yes | No | Yes |
| Line speed (at 175 mil) | Ft./minute | 100-500 | 50-125 | 100-500 | 100-500 |
| Energy Consumption | | Low | High | Medium | Low |

As depicted by Table 1, the hydrosilylation curing of the polyolefin compositions disclosed herein exhibits comparable mechanical and electrical properties as the comparative curing processes with decreased manufacturing difficulties such as requirements for a continuous vulcanization tube or an additional degassing step. As such, hydrosilylation processes can allow for the reduction of energy, time, and cost required to produce functionally equivalent cable components such as insulation and jacket layers. In certain embodiments, a manufacturing process using a hydrosilylation process can require significantly less power than the comparative processes and can use, for example, at least about 30% less power.

As can be appreciated, power cables can be formed in a variety of configurations including as single-core cables, multi-core cables, tray cables, inter-locked armored cables, and continuously corrugated welded ("CCW") cable constructions. The conductors in such power cables can be surrounded by one or more insulation layers and/or jacket layers. According to certain embodiments, one or more of such insulation layers or jacket layers can be formed with a polyolefin composition as disclosed herein.

An illustrative, single-core, power cable is depicted in FIG. 1. The single-core power cable in FIG. 1 includes a conductor 1, a conductor shield 2, an insulation layer 3, an insulation shield 4, a neutral wire 5, and a jacket layer 6. In such an example, the insulation layer 3 or the jacket layer 6 could be formed with the crosslinkable polyolefin composition disclosed herein. As will be appreciated, certain power cables can also be formed having fewer components and can, for example, optionally omit one or more of the conductor shield 2, insulation shield 4, or neutral wire 5.

The conductor, or conductive element, of a power cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 1 kcmil conductor to a 1,500 kcmil conductor in certain embodiments, a 4 kcmil conductor to a 1,000 kcmil conductor in certain embodiments, a 50 kcmil conductor to a 500 kcmil conductor in certain embodiments, or a 100 kcmil conductor to a 500 kcmil conductor in certain embodiments. The voltage class of a power cable including such conductors can also be selected. For example, a power cable including a 1 kcmil conductor to a 1,500 kcmil conductor and an insulating layer formed from a suitable thermoset composition can have a voltage class ranging from about 1 kV to about 150 kV in certain embodiments, or a voltage class ranging from about 2 kV to about 65 kV in certain embodiments. In certain embodiments, a power cable can also meet the medium voltage electrical properties of ICEA test standard S-94-649-2004 or similar high voltage cable standards.

EXAMPLES

Tables 2 to 5 depict the compositional details and mechanical properties of several example crosslinkable compositions. Mechanical properties were measured using molded plaques.

Table 2, including Examples 1 to 3, depicts Inventive Examples and describe crosslinkable polyolefin resin compositions. Table 3, including Examples 4 to 7, depicts Comparative Examples. Comparative Examples 6 and 7 utilize a comparative peroxide curing process and a CV tube but demonstrate the mechanical and electrical properties desirable in a hydrosilylation crosslinking method. Examples 1 to 5, produced with a hydrosilylation crosslinking method, were produced by adding the resin, fillers, additives, and crosslinking agent to a brabender mixer at 100° C. and mixing for 7 minutes. The hydrosilylation catalyst was then added and the composition was mixed for another 3 minutes. Molded plaques were then formed using a 350° F. molding platen. The Examples were evaluated after the molded plaques spent 5 minutes in the molding platen to allow for crosslinking to complete.

TABLE 2

|  | Example 1 | Example 2 | Example 3 |
|---|---|---|---|
| Component |  |  |  |
| EPDM resin (formed with VNB having a 0.9% diene content) | 80 | 80 | 90 |
| EPDM resin (formed with ENB having a 9.4% diene content) | 20 | 20 | 10 |
| Tris(dimethylsiloxy)phenyl silane | 5 | 3.5 | 5 |
| 2% Platinum Complex Masterbatch (40 ppm in the composition) | 0.2 | 0.2 | 0.2 |
| Calcined clay | — | — | — |
| Dicumyl peroxide | — | — | — |
| 1,2-dihydro-2,2,4-trimethylquinoline | 0.8 | 0.8 | 0.8 |
| Hindered Amine Light Stabilizer | 0.8 | 0.8 | 0.8 |
| Total Diene % | 2.52% | 2.52% | 1.80% |
| Properties |  |  |  |
| Hot Creep test (@ 150° C.) | Pass | Pass | Pass |
| Elongation at break (%) | 350 | 295 | 321 |
| Mooney Scorch (TS5); 30 mins @ 121° C. | >30 | >30 | >30 |
| Mooney Scorch (TS2); 30 mins @ 121° C. | >30 | >30 | >30 |
| Gel Content (%) | 78.3 | — | — |

TABLE 3

|  | Example 4 | Example 5 | Example 6 | Example 7 |
|---|---|---|---|---|
| Component |  |  |  |  |
| EPDM resin (formed with VNB having a 0.9% diene content) | 100 | 100 | 20 | 100 |
| EPDM resin (formed with ENB having a 9.4% diene content) | — | — | 80 | — |
| Tris(dimethylsiloxy)phenyl silane | 5 | 5 | — | — |
| 2% Platinum Complex Masterbatch (40 ppm in the composition) | 0.2 | 0.2 | — | — |
| Calcined clay | 10 | — | 10 | 10 |
| Dicumyl peroxide | — | — | 2 | 2 |
| 1,2-dihydro-2,2,4-trimethylquinoline | 0.8 | 0.8 | 0.8 | 0.8 |
| Hindered Amine Light Stabilizer | 0.8 | 0.8 | 0.8 | 0.8 |
| Total Diene % | 0.90% | 0.90% | 7.70% | 0.90% |
| Properties |  |  |  |  |
| Hot Creep test (@ 150° C.) | Fail | Fail | Pass | Pass |
| Elongation at break (%) | 160 | NA | 280 | 307 |
| Mooney Scorch (TS5); 30 mins @ 121° C. | >30 | >30 | >30 | >30 |
| Mooney Scorch (TS2); 30 mins @ 121° C. | >30 | >30 | >30 | >30 |
| Gel Content | — | — | 96.9 | — |

As depicted by Tables 2 and 3, Inventive Examples 1 to 3 depict similar properties to conventional curing systems including similar levels of crosslinking as depicted by a gel content of 78.3% in Inventive Example 1. Examples 6 and 7 are conventionally cured using a peroxide curing process. Gel content was measured in accordance to ASTM D2765 (2011). Suitable gel content levels for the crosslinked polyolefin resins described herein can be about 20% or more in certain embodiments, about 50% or more in certain embodiments, and about 70% or more in certain embodiments. Suitable elongation at break values can include values of about 100% or more in certain embodiments, about 150% or more in certain embodiments, about 200% or more in certain embodiments, and about 300% or more in certain embodiments. Suitable Mooney Scorch (TS5 and Ts2) values can include values of about 20 or more.

Tables 4 and 5 depict additional examples of crosslinkable compositions. The compositions of Tables 4 and 5 were prepared and evaluated similarly to the examples of Tables 2 and 3. Table 4 generally includes examples of crosslinkable compositions wherein the polyolefin resin is about 50% or more LDPE. Table 5 generally includes examples of crosslinkable compositions wherein the polyolefin resin is about 50% or more EPDM.

TABLE 4

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Component |  |  |  |  |  |  |  |  |  |
| LDPE Resin (1-2% diene) | 100 | 100 | 100 | 100 | 80 | — | 100 | 100 | 100 |
| LDPE Resin (0.5-1% diene) | — | — | — | — | — | 80 | — | — | — |
| EPDM (9.4% ENB) | — | — | — | — | 20 | 20 | — | — | — |
| Methyhydrogen dimethylsiloxane hydride terminated copolymer | 2.5 | 5 | 2.5 | 2.5 | 5 | 5 | 2.5 | 5 | 5 |
| Trimethoxy methyl hydrogen dimethylsiloxane hydride terminated copolymer | 2.5 | — | 2.5 | 2.5 | — | — | 2.5 | — | — |
| Treated silica | — | — | — | — | — | — | — | 5 | — |
| Silica | — | — | 1 | 2.5 | 2.5 | 2.5 | 5 | — | 5 |
| Catalyst | 0.2 | 0.2 | 0.2 | 0.2 | 0.2 | 0.2 | 0.2 | 0.2 | 0.2 |

TABLE 4-continued

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Antioxidant | 0.8 | 0.8 | 0.8 | 0.8 | 0.8 | 0.8 | 0.8 | 0.8 | 0.8 |
| Stabilizer | 0.8 | 0.8 | 0.8 | 0.8 | 0.8 | 0.8 | 0.8 | 0.8 | 0.8 |
| Total | 106.8 | 106.8 | 107.8 | 109.3 | 109.3 | 109.3 | 111.8 | 111.8 | 111.8 |
| Properties |  |  |  |  |  |  |  |  |  |
| Hot Creep Test (@ 150° C.) | Fail | Fail | Fail | Pass | Pass | Pass | Pass | Pass | Pass |
| Hot Creep at 150° C. | — | — | — | 31.8 | 27.4 | 34.8 | 19.4 | 31.2 | 33.9 |
| % Set | — | — | — | −7.8 | 3.8 | 8.9 | −11.4 | −2.2 | −3.5 |
| Tensile Strength (PSI) | — | — | — | — | — | — | 1929 | 1876 | 1885 |
| Elongation at break (%) | — | — | — | — | — | — | 279.2 | 273.7 | 273.5 |

As depicted by Table 4, Examples 8 to 10 are considered Comparative Examples because they fail the Hot Creep Test. Examples 11 to 16 are Inventive Examples because they demonstrate favorable mechanical properties.

TABLE 5

|  | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|
| Components |  |  |  |  |  |  |  |  |  |
| EPDM (0.9% VNB) | 100 | 100 | 80 | 80 | 100 | 80 | 80 | 80 | 80 |
| EPDM (9.4% ENB) | — | — | 20 | 20 | — | 20 | 20 | 20 | 20 |
| LLDPE (0.9% diene) | — | — | — | — | — | — | — | — | 20 |
| Trimethoxy methyl hydrogen dimethylsiloxane hydride terminated copolymer | 4 | 4 | 4 | 4 | 4 | 4 | — | 2 | 2 |
| Methylhydrogen dimethylsiloxane hydride terminated copolymer | — | — | — | — | — | — | 4 | 2 | 2 |
| Filler | — | 10 | — | 10 | 50 | 25 | 25 | 25 | 25 |
| Catalyst | 0.2 | 0.2 | 0.2 | 0.2 | 0.2 | 0.2 | 0.2 | 0.2 | 0.2 |
| Antioxidant | 0.8 | 0.8 | 0.8 | 0.8 | 0.8 | 0.8 | 0.8 | 0.8 | 0.8 |
| Stabilizer | 0.8 | 0.8 | 0.8 | 0.8 | 0.8 | 0.8 | 0.8 | 0.8 | 0.8 |
| Total | 105.8 | 115.8 | 105.8 | 115.8 | 155.8 | 130.8 | 130.8 | 130.8 | 150.8 |
| Properties |  |  |  |  |  |  |  |  |  |
| Tensile Strength (PSI) | — | — | — | — | — | 676 | 770 | 864 | 1100 |
| Elongation at Break (%) | — | — | — | — | — | 153 | 199 | 257 | 225 |
| Hot Creep Test (@ 150° C.) | Fail | Fail | Pass | Pass | Pass | 18.1 | 18.1 | 20.7 | 19.3 |
| % Set | — | — | — | — | — | −3.9 | −3.5 | −0.3 | −0.7 |

As depicted by Table 5, Examples 17 and 18 are considered Comparative Examples because they fail the Hot Creep Test. Examples 19 to 25 are Inventive Examples because they demonstrate favorable mechanical properties.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A cable comprising a covering formed from a composition, the composition comprising:
   a polyolefin resin comprising about 1% to about 7% by weight of diene groups, wherein the polyolefin resin comprises about 50% by weight or more of one or more of low-density polyethylene, linear low-density polyethylene, high-density polyethylene, and polypropylene;
   a silyl hydride crosslinking agent;
   a catalyst; and
   2.5 to 5 parts by weight of a filler; and
   wherein the diene groups are crosslinked with the silyl hydride crosslinking agent.

2. The cable of claim 1, wherein the polyolefin resin comprises about 50% by weight or more of one or more of low density polyethylene and linear low density polyethylene; and
   wherein the diene groups comprise grafted diene groups; and
   wherein the diene groups comprise vinyl functional groups.

3. The cable of claim 2, wherein the polyolefin resin further comprises about 5% to about 40% by weight of ethylene propylene diene terpolymer.

4. The cable of claim 1, wherein the composition further comprises a stabilizer, the stabilizer comprising one or more of an antioxidant, a UV stabilizer, a heat stabilizer, a lead stabilizer, and a metal deactivator.

5. The cable of claim 1, wherein the filler comprises one or more of talc, silica, and calcined clay.

6. The cable of claim 1, wherein the composition comprises about 2 parts to about 10 parts by weight of the silyl hydride crosslinking agent; and
   wherein the silyl hydride crosslinking agent comprises one or more of hydride terminated polydimethyl siloxane, hydride terminated polymethyl siloxane, tris (dimethylsiloxy)phenyl silane, and 1,10 disiladecane.

7. The cable of claim 1, wherein the catalyst comprises a Column VIII metal, cobalt, iron, nickel, or a metal complex thereof; and
   wherein the catalyst comprises a concentration of the metal content from about 1 part-per-million (ppm) to about 1,000 ppm.

8. The cable of claim 7, wherein the catalyst comprises a platinum complex.

9. The cable of claim 1, wherein the covering exhibits a TS5 Mooney Scorch (TS5) of about 15 or more when measured at 121° C.

10. The cable of claim 1, wherein the covering has an elongation at break of about 150% or more.

11. The cable of claim 1, wherein the covering passes the Hot Creep Test at 150° C.

12. The cable of claim 1, wherein the covering has a tan delta at about 23° C. of about 0.3% or less.

13. The cable of claim 1, wherein the covering has a gel content of about 50% or more when measured in accordance to ASTM D2765.

14. The cable of claim 1, wherein the covering is one or more of an insulation layer and a jacket layer.

* * * * *